Figure 1:
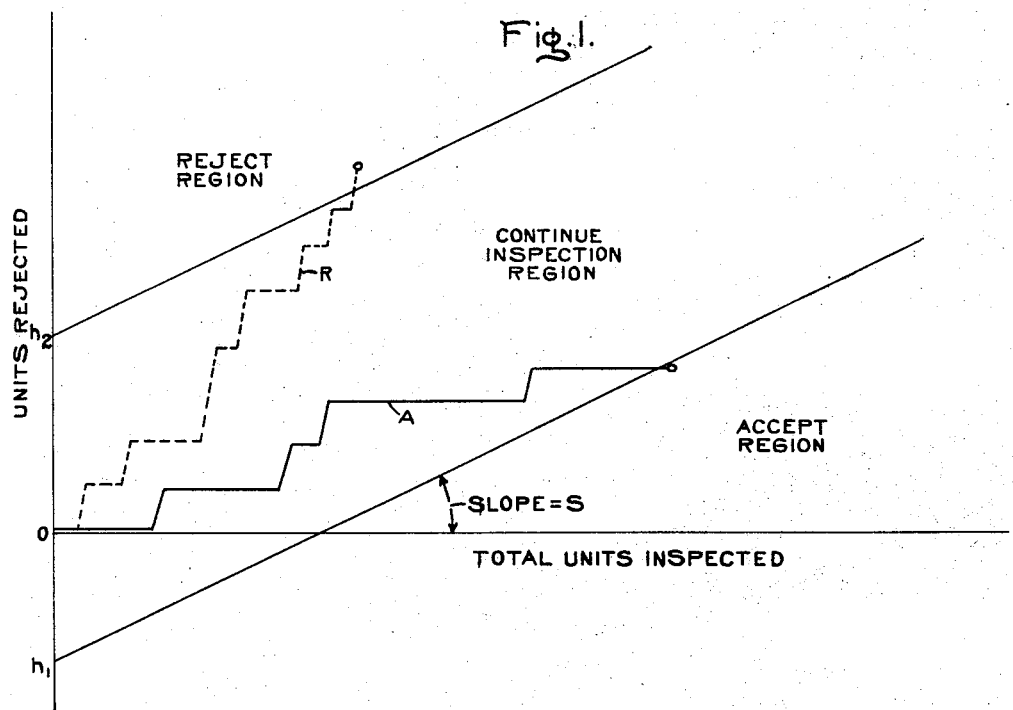

July 7, 1959  L. G. GITZENDANNER  2,893,635
QUALITY CONTROL SEQUENTIAL ANALYZER
Filed Sept. 12, 1952  2 Sheets-Sheet 1

Inventor:
Louis G. Gitzendanner,
by Paul A. Frank
His Attorney.

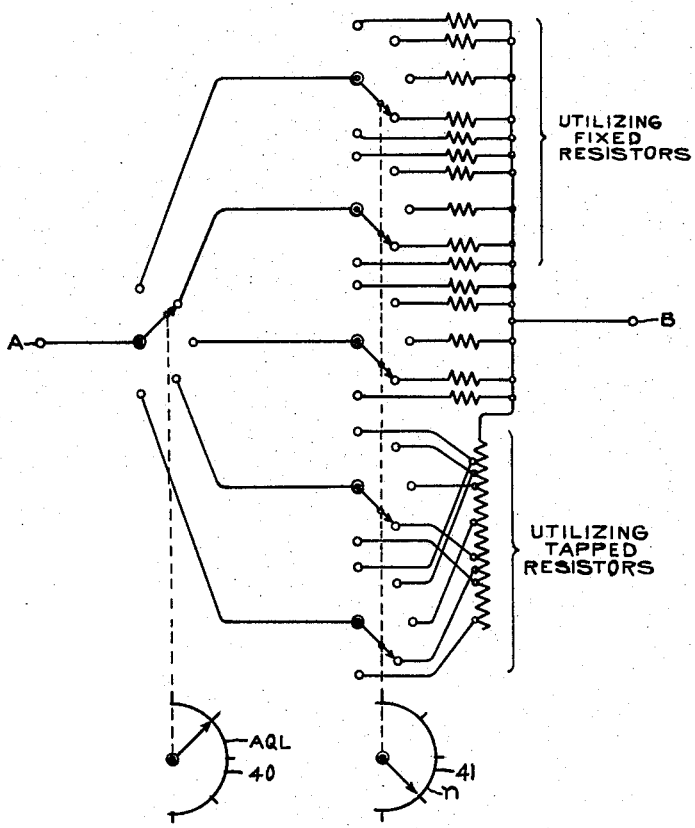

2,893,635

QUALITY CONTROL SEQUENTIAL ANALYZER

Louis G. Gitzendanner, Schenectady, N.Y., assignor to General Electric Company, a corporation of New York Application September 12, 1952, Serial No. 309,349

11 Claims. (Cl. 235—168)

This invention relates to sequential sampling analysis. In sequential sampling of material to determine whether an entire lot is acceptable or rejectable, the data with regard to the lot are considered after each unit has been inspected and before additional units are inspected. If the accumulated data are of sufficient significance to indicate that the entire lot ought to be accepted or rejected, further inspection may be omitted. In many cases this sampling approach saves time, particularly where a lot is so good that a quantity of samples selected at random are all acceptable or so bad that a quantity of samples selected at random are all rejectable. In such a case, the entire lot may be accepted or rejected after a rather brief inspection. This method of inspection is in sharp contrast to a method which requires that a certain predetermined proportion of the units making up each lot be inspected and the data resulting therefrom be evaluated before a decision is reached as to whether or not the entire lot should be accepted or rejected. The theory of sequential sampling plans was developed by Abraham Wald and is set forth in his book "Sequential Analysis," John Wiley and Sons, Inc., New York, 1948.

While the sequential sampling plan provides equally reliable results with, on an average, fewer units tested, it is not readily used by unskilled persons due to the mathematical ramifications of the method. In using a sequential inspection plan, the inspector starts inspecting sample units and after inspecting each unit reaches one of the following three decisions:

(1) The data to date are strong enough to justify rejecting the entire lot.

(2) The data to date are strong enough to justify accepting the entire lot.

(3) The data to date are insufficient to justify accepting or rejecting and more samples must be tested to provide data to justify a decision to accept or reject.

Thus, for a given set of conditions, a chart of units inspected versus number of rejects found may be plotted. A graph thus plotted will consist of two boundary lines dividing the coordinate area into three regions a first of which will represent an "accept" region, a second of which will represent a "continue inspection" region, and a third of which will represent a "reject" region.

It is an object of this invention to provide an analyzer which will automatically indicate to an inspector when a particular lot is subject to acceptance or rejection in accordance with the graph.

It is another object of this invention to provide an analyzer in which a false accept or reject signal cannot occur.

A further object of the invention is to provide a sequential analyzer in which a single biasing resistor is used in both the accept and reject circuits.

A still further object of the invention is to provide a sequential analyzer in which a sensitive circuit selector mechanism selects an accept or reject signalling circuit in response to two variable resistors connected through the operating circuit of the switch in opposed relationship.

In accordance with one of its aspects, this invention comprises a circuit selector switch responsive to the magnitude and direction of an energizing current, a pair of signal circuits connected to the switch, each of which circuits is responsive to opposite directions of flow of energizing current through the switch, a first variable resistor and a first manually operated means for changing the voltage drop across portions of the first variable resistor in uniform steps, a second variable resistor, a second manually operated means for changing the voltage drop across portions of both variable resistors in uniform steps, a circuit connecting the first and second variable resistors in opposition through the circuit selector switch whereby advancing the setting of either resistor increases the voltage from that resistor circuit through the switch, a biasing third variable resistor connected initially across the first and second variable resistors in shunt of the circuit selector switch, and a relay or similar switching device energized by operation of the second manually operated means, the relay having contacts which reverse the flow of current through the circuit selector switch when the relay is energized.

Figure 2:
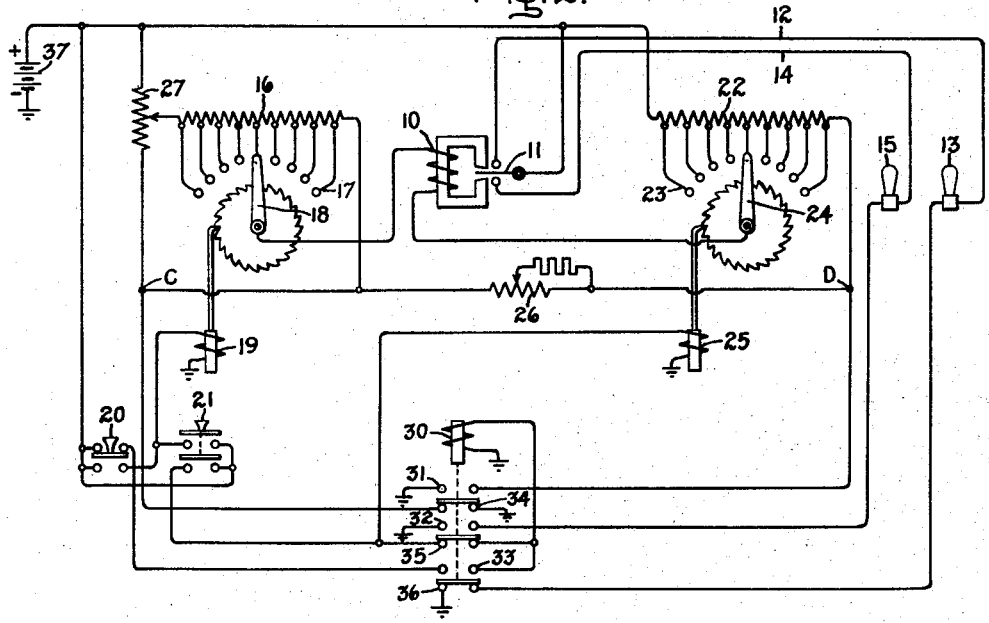

The operation of my device may be better understood by referring to the drawing wherein Fig. 1 is a coordinate system illustrating the operation of a sequential sampling technique; Fig. 2 is a schematic diagram of a sequential sampling analyzer; and Fig. 3 is an alternative embodiment of certain of the elements illustrated in Fig. 2.

In sequential sampling, four basic factors enter into the criteria of when a decision may be made. They are:

$P_1$ = The quality level specified in terms of fraction defective which will still allow the lot to be accepted. This depends upon the type of material undergoing test but $P_1$ commonly ranges from ¼% to 3%.

$n$ = The size of the lot.

$(1-\alpha)$ = Degree of certainty that a decision to reject is correct. In other words, $\alpha$ is the fraction expressing the possibility that material of specified quality level will be erroneously rejected. Commercial practice has usually set $\alpha$ at about 0.05.

$(1-\beta)$ = Degree of certainty that a decision to accept is correct. $\beta$ expresses the possibility of accepting the material of quality level $P_2$ where $P_2$ is greater than $P_1$. $\beta$ is generally set at about 0.10 and $P_2$ is chosen so the plan will give the same degree of protection against defective material as the accepted single sampling plan gives. Thus, $P_2$ is determined by $P_1$ and $n$. The boundary lines of a plot shown in Fig. 1 are determined in terms of $\alpha$, $\beta$, $P_1$ and $P_2$ by the following equations:

$$h_1 = \frac{\log \frac{\beta}{1-\alpha}}{D}$$

$$h_2 = \frac{\log \frac{1-\beta}{\alpha}}{D}$$

$$S = \frac{\log \frac{1-P_1}{1-P_2}}{D}$$

where $$D = \log \frac{P_2}{P_1} + \log \frac{1-P_1}{1-P_2}$$

The above equations were developed by Wald and are set forth in his book to which reference was previously made.

The quantities $h_1$ and $h_2$ are the intercepts as shown on the plot of Fig. 1 and $S$ is the slope of the lines.

Thus, where T is the total number of units inspected the number of units which must be defective in order to reject the entire lot is the number of units inspected multiplied by the slope S plus $h_2$. The accept boundary line is obtained by multiplying the slope times the total number of units inspected and subtracting from this quantity $h_1$. Curves A and R of Fig. 1 illustrate the operation of a sequential inspection system. In each case inspection continues as long as the curve is in the continue inspection region defined by the equations noted above. As soon as a curve crosses one of the boundaries of the "continue inspection" region inspection may be discontinued. Thus, the curve A eventually crosses the accept boundary to indicate that the entire lot would be acceptable. The curve R eventually crosses into the reject region which indicates that the entire lot should be rejected. It is to be noted that in the case of curve A, a greater number of units were inspected before a decision could be reached. It should also be noted that the reject region may be attained only if the last unit inspected was a reject while the accept region may be attained only if the last unit inspected is acceptable.

The circuit illustrated in Fig. 2 enables an inspector to perform sequential sampling as illustrated in Fig. 1 without prior knowledge of the system. In the circuit of Fig. 2 a circuit selector switch 10, which is responsive to the magnitude and direction of an energizing current, has contacts 11 which are operated to complete either an accept circuit 12 to operate a signalling device 13 or a reject circuit 14 to operate a signalling device 15. The circuit selector switch 10 may be a polarized relay or any other device performing a similar function such as a non-polarized relay with a reversing switch in its coil circuit operated by a separate relay or it may be an electrostatic device or electronic detecting means. The signalling devices 13 and 15 may conveniently be signal lamps but could as readily be sound producing devices or devices which operate a valve (not shown) to shift material undergoing test either to an accept bin or a reject bin.

The circuit which controls operation of the circuit selector switch 10 comprises a first variable resistor 16, which conveniently has a plurality of taps 17 spaced to provide uniform steps over which a wiper contact 18 moves under control of a stepping magnet 19 energized by the manual operation of a first pushbutton 20 or a second pushbutton 21. A second variable resistor 22 has a plurality of spaced taps 23 which serve as terminals over which a wiper 24 moves under the control of a stepping magnet 25 which is energized by the manual operation of the pushbutton 21. The variable resistors 16 and 22 may be incorporated as elements in any of the well known stepping switches commercially available and these resistors may have as many as several hundred taps. However, for purposes of simplicity and clarity of illustration, the complex stepping switch mechanism has not been illustrated. Furthermore, the mechanism for releasing and restoring the wipers 18 and 24 has also been omitted.

The variable resistors 16 and 22 are connected by their wipers 18 and 24 to the actuating circuit of relay 10. Thus, as the wipers 18 and 24 move across the taps 17 and 23, potentials are contacted which in general will not be equal and will subject relay 10 to a voltage causing it to operate.

The electrical equivalent of the intercepts $h_1$ and $h_2$ of Fig. 1 is provided by a variable biasing resistor 26 which may be shifted in the circuit to provide bias equal to $h_1$ in one case and $h_2$ in the other. This is feasible due to the fact that the ratio of $h_1$ and $h_2$ is fixed since it is set uniquely by $\alpha$ and $\beta$ which are established by convention and seldom changed. Thus, if the resistance 16 is large compared to potentiometer 27 so the setting of the arm on 27 has but little effect on the parallel resistance of 27 and 16, then the ratio of resistance of 26 plus 27 to resistance 26 plus 22 will determine the ratio $h_1$ to $h_2$. The electrical equivalent of the slope of the lines plotted in Fig. 1 is provided by a potentiometer 27 which may be set to regulate the effect of the variable resistor 16 on the potential wiper 18 applied to relay 10.

Operation of pushbutton 21 completes the circuit for a relay 30 which upon being energized locks through its contacts 33, opens its contacts 34, and closes its contacts 31 thereby shifting the ground lead from one side of the biasing resistor 26 to the other side. The relay 30 opens its contacts 36 and closes its contacts 32 when the circuit through the pushbutton 21 is closed, thereby preventing the operation of the signal lamp 13 when the pushbutton 21, which is the reject button, is depressed. It should be emphasized that the relay 30 is not a necessary element in the circuit inasmuch as the switching functions performed by the relay 30 could as well be performed by the pushbutton 21 by adding additional contacts thereto, some of which would be normally closed. The embodiment illustrated represents a preferred form only.

Power to operate the illustrated circuit is provided by a direct current source 37. While a battery is illustrated, any other source of direct current power would be just as satisfactory for use as the direct current source 37, for example, rectified alternating power may be used.

In operating a sequential sampling analyzer of the type illustrated in Fig. 2, the biasing resistor 26 is set for the proper intercept and the potentiometer 27 is set to give the proper slope. Both of these adjustments depend on the nature of the goods undergoing inspection and the desired quality level. Knowledge of the sequential sampling approach is necessary for proper setting of the elements 26 and 27. However, when the setting for these elements has been determined, further operation of the analyzer may be entrusted to the hands of an inspector not skilled in mathematics and the interpretation of graphs. It is only necessary for the inspector to utilize the pushbutton 20 as an accept indicator and the pushbutton 21 as a reject indicator. For each acceptable unit, the inspector presses the pushbutton 20; for each reject unit the inspector presses the pushbutton 21. Each time the inspector closes the circuit of pushbutton 20, the wiper 18 advances to the next tap 17. This increases the potential applied through wiper 18 to relay 10 and causes the potential across relay 10 to change in a direction tending to close the circuit of the accept signal lamp 13. On the graph of Fig. 1, this is comparable to a line drawn horizontally toward the accept region. If a unit is not acceptable, the inspector closes the circuit of pushbutton 21 which energizes both stepping magnets 19 and 25 to advance the wipers 18 and 24 a step along their respective taps 17 and 23. At the same time operation of pushbutton 21 energizes relay 30 which by closing contact 31 and opening contact 34 shifts the ground point on potentiometer 26 from point C to D. This removes the bias introduced by potentiometer 26 from the circuit of tap resistor 22 thereby reducing the potential of tap 23 and of wiper 24. Shifting the ground point from C to D introduces the potentiometer 26 as a bias in the circuit of tapped switch 16 thereby increasing the potential of taps 17 and wiper 18. With the circuit grounded at point D the bias introduced in the circuit of tapped resistor 16 is such as to cause the potential of wiper 18 to be increased. This has the action on relay 10 to tend to operate the contact 11 in a direction to close the accept circuit. However, since the assumption is that the reject button 21 has been pressed and relay 30 has operated, it follows that contact 36 is open and closure of contact 11 failed to energize the accept circuit 12 and the signal device 13. In effect, the relay 10 compares the voltage on wiper 24 which voltage is now proportional to the total number of rejects recorded, to the voltage on wiper 18, which voltage is proportional to the total number of units tested plus a voltage as introduced by biasing resistor 26 which is proportional to the intercept $h_2$. If the number of rejects is high enough to warrant rejecting the entire lot, the contact 11 will close in the direction to energize circuit 14 thereby operating the lamp 15 through contact 32 which has been previously closed by operation of relay 30.

If the lamp 15 did not light after a particular unit was rejected and the pushbutton 21 depressed, the inspection would continue. If the next unit was acceptable, the inspector would press the pushbutton 20 to break the locking circuit of the relay 30 and re-establish a ground connection at point C. Operation of pushbutton 20 also advances the stepping switch 19 and advances wiper 18 on tap 17. Shifting the ground connection back to point C moves the biasing resistor 26 to the opposite side of the circuit and causes the circuit to compare along the plot marking the boundaries to the accept region. The crossing of this boundary line will be marked by closure of the contacts 11 to light up the signal lamp 13 indicating to the inspector that inspection may be discontinued and the entire lot accepted.

The energization of the relay 30 opens the circuit for the signal lamp 13 and prepares the circuit for the signal lamp 15. Likewise the energizing relay 30 closes the circuit for signal lamp 13 and opens the circuit for signal lamp 15. This arrangement is necessary since contacts 11 of relay 10 are in general operated to close either circuit 12 or 14. The setting of contact 11 would open both circuits 12 and 14 only if the potential supplied by wipers 18 and 24 to relay 10 caused the voltage applied to relay 10 to be less than the amount dictated by the sensitivity of relay 10. It is ideally desired that there be no dead band in the operation of relay 10; that is, that the contact 11 of relay 10 shift from closing circuit 12 to closing circuit 14 with a minimum of change in voltage applied to the actuating member of relay 10.

In order to simplify the initial set-up of the apparatus illustrated in Fig. 2, certain of the elements thereof may be replaced by the resistors illustrated in Fig. 3. The resistance element of Fig. 3 may be substituted for the biasing resistor 26 of Fig. 2. It will, of course, be obvious to those skilled in the art that the resistance element of Fig. 3 may also be used in lieu of potentiometer 27 of Fig. 2. If substituted for the potentiometer of Fig. 2 or the biasing resistor 26 of Fig. 2, it is possible to select the correct tap by setting a selector switch 40 in terms of quality level and a selector switch 41 in terms of lot size. Thus, the operator is relieved of even having to be able to use a chart or table since the basic data given him are in the form required. As opposed to the illustration of Fig. 2, the values of $P_1$ and $n$ cannot be handled as continuous variables. However, in general, $n$ can have a range such as 300–499, 500–799, etc., and it is usual for $P_1$ to have definite integral or fractional values such as ¼%, ½%, 1%, 3%, 5%, etc. It is thus practical to substitute tap switching for continuously variable resistances with resultant simplification for the inspector.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A sampling analyzer comprising a pair of impedances adapted to be connected across a source of potential and having movable intermediate output terminals, means to move the output terminal on one impedance in accord with the number of units sampled to provide a voltage proportional thereto, means to move the output terminal on the other impedance in accord with samples rejected to provide a voltage proportional thereto, and means to provide a reference voltage representing minimum boundary conditions for acceptability and rejectability of said samples, said last named means being connected in series with said one impedance in response to the rejection of a unit and in series with said other impedance for all other units sampled, means connected between the output terminals to compare the polarity and magnitude of said voltages, and a pair of indicating means selectively actuated by said comparing means.

2. A sampling analyzer comprising a pair of impedances adapted to be connected across a source of potential and having movable intermediate output terminals, means to move the output terminal on one impedance in accord with the number of units sampled to provide a voltage proportional thereto, means to move the output terminal on the other impedance in accord with the number of units rejected to produce a voltage proportional thereto, biasing voltage means selectively connected in series with said one impedance in response to rejected units and to said other impedance for all other units sampled, polarity sensitive means connected between the terminals on said impedances to compare said voltages, and a pair of indicating means selectively actuated by said comparing means.

3. A sampling analyzer comprising first and second impedances adapted to be connected across a source of potential and having movable intermediate output terminals, means to move the output terminal on said first impedance in accord with the number of units sampled to provide a voltage proportional thereto, means to move the output terminals on said second impedance in accord with the number of units rejected to provide a voltage proportional thereto, means to control the effect of said first impedance including an impedance means having said first impedance adjustably connected across a portion thereof, polarity sensitive means connected between said output terminals to compare said voltages, and a pair of indicating means selectively actuated by said comparison means.

4. A sampling analyzer comprising first and second impedances adapted to be connected across a source of potential and having movable intermediate output terminals, means to move the output terminal on said first impedance in accord with the number of units sampled to provide a voltage proportional thereto, means to move the output terminal on said second impedance in accord with the number of units rejected to provide a voltage proportional thereto, biasing voltage means selectively connected in series with said first impedance upon rejection of a unit and to said second impedance for all other units sampled, third impedance means having a portion thereof adjustably connected across said first impedance to control the effect thereof, polarity sensitive means connected between said terminals to compare said voltages, and a pair of indicating means selectively actuated by said comparing means.

5. A sampling analyzer comprising a first and second impedance means adapted to be connected across a source of potential and having movable intermediate output terminals, manual means to move the output terminals on said first and second impedances respectively in accord with the number of units tested and rejected to provide voltages proportional thereto, biasing voltage means selectively connected to said first and second impedances, means responsive to said manual means for selectively connecting said biasing voltage means in series with said first impedance upon rejection of a unit and to said second impedance for all other units tested, polarity sensitive means connected between said terminals to compare said voltages, and a pair of indicating means selectively actuated by said comparison means.

6. A sequential sampling analyzer comprising first and second resistors adapted to be connected across a source of potential and having intermediate output terminals movable in discrete steps, a first manual means to move the output terminal on said first resistor in accord with the number of units sampled to produce a voltage proportional thereto, a second manual means to operate the output terminal on said second resistor in accord with the number of units rejected to produce a voltage proportional thereto, biasing voltage means including a third resistor selectively connected in series with said first and second resistors, said last named means being connected in series with said first resistance upon rejection of a unit and with said second resistor for all other units sampled, relay means connected between said terminals and responsive to the polarity and magnitude of the voltages between said terminals, and a pair of indicating means selectively actuated by said relay means.

7. A sequential sampling analyzer comprising first and second resistors adapted to be connected across a source of potential and having intermediate output terminals movable in uniform discrete steps, a first manual means to move the terminal on said first resistor in accord with the number of units sampled to provide a voltage proportional thereto, a second manual means to move the terminal on said second resistor in accord with the number of units rejected to provide a voltage proportional thereto, biasing voltage means including a third resistor selectively connected to said first and second resistors, switch means responsive to said second manual means to control the connection of said biasing means whereby said biasing means is connected in series wtih said first resistor upon rejection of a unit and in series with said second resistor for all other units sampled, relay means connected between said output terminals and responsive to the polarity of the voltages between said terminals, and a pair of indicating means selectively actuated by said relay means.

8. A sequential sampling analyzer comprising a first resistor connected across a source of potential and having a plurality of uniformly spaced taps, a first wiper movable along said taps, first actuating means for moving said first wiper into engagement with successive taps in accord with the number of units sampled to provide a voltage proportional thereto, a second resistor connected across said source of potential having a plurality of spaced taps, a second wiper movable along said taps, second actuating means for moving said second wiper means into engagement with successive taps in accordance with the number of units rejected to provide a voltage proportional thereto, biasing voltage means including a third resistor adapted to be selectively connected to said first and second resistors, switch means responsive to said second actuating means to connect said biasing means in series with said first resistor upon rejection of a unit and in series with said second resistor for all other units sampled, relay means responsive to the polarity of the voltages connected between said first and second wiper means, and a pair of indicating means selectively actuated by said relay.

9. A sequential sampling analyzer comprising a first resistor connected across a source of potential and having a plurality of uniformly spaced taps, a first wiper movable along said taps, a first electrically actuated stepping mechanism for moving said first wiper into engagement with successive taps in accord with the number of units sampled to provide a voltage proportional thereto, a first push button circuit to actuate said first stepping mechanism with every accepted unit, a second resistor connected across a source of potential and having a plurality of uniformly spaced taps, a second wiper movable along said taps, a second electrically actuated stepping mechanism for moving said second wiper into engagement with successive taps in accord with the number of units rejected to provide a voltage proportional thereto, a second push button circuit to actuate both said first and second stepping mechanisms whereby said first wiper is positioned in accord with the number of units sampled and said second wiper in accord with the number of units rejected, biasing voltage means including a third resistor selectively connected to said first and second resistors, switch means responsive to said second push button circuit to connect said biasing means in series with said first resistor upon rejection of a unit and in series with said second resistor for all other units sampled, polarized relay means connected between said first and second wipers, and a pair of indicating means selectively actuated by said relay.

10. A sequential sampling analyzer comprising a first resistor connected across a source of potential including a potentiometer, a portion of which is connected across said first resistor, said first resistor having a plurality of uniformly spaced taps, a first wiper movable along said taps, a first electrically actuated stepping mechanism for moving said first wiper into engagement with successive taps in accord with the number of units sampled to provide a voltage proportional thereto, a first push button circuit to actuate said first stepping mechanism with every accepted unit, a second resistor connected across a source of potential and having a plurality of uniformly spaced taps, a second wiper movable along said taps, a second electrically actuated stepping mechanism for moving said second wiper into engagement with successive taps in accord with the number of units rejected to provide a voltage proportional thereto, a second push button circuit to actuate both said first and second stepping mechanisms whereby said first wiper is positioned in accord with the number of units sampled and said second wiper in accord with the number of units rejected, biasing voltage means including a third resistor selectively connected to said first and second resistor, switch means responsive to said second push button circuit to connect said biasing means in series with said first resistor upon rejection of a unit and in series with said second resistor for all other units sampled, polarized relay means connected between said first and second wipers, and a pair of indicating means selectively actuated by said relay.

11. A sequential sampling analyzer comprising first and second resistors adapted to be connected across a source of potential and having intermediate output terminals movable in discrete steps, a first manual means to move the output terminals on said first resistor in accord with the number of units sampled to provide a voltage proportional thereto, a second manual means to move the output terminals on said second resistor in accord with the number of units rejected to provide a voltage proportional thereto, biasing voltage means including a variable third resistor selectively connected to said first and second resistors, said biasing voltage means being connected to said first resistor in response to rejected units and to said second resistor for all other units sampled, said third resistor having a plurality of taps actuated by means of a selector switch, relay means connected between said output terminals and responsive to the polarity of the voltages between said terminals, and a pair of indicating means selectively actuated by said relay means.

References Cited in the file of this patent

UNITED STATES PATENTS

| | | |
|---|---|---|
| 2,530,351 | Fales | Nov. 14, 1950 |
| 2,560,172 | Jones | July 10, 1951 |
| 2,602,586 | Davidson | July 8, 1952 |
| 2,617,589 | Jones | Nov. 11, 1952 |
| 2,679,355 | Savino | May 25, 1954 |
| 2,688,740 | Merrill et al. | Sept. 7, 1954 |
| 2,768,784 | Gordon et al. | Oct. 30, 1956 |